United States Patent [19]

Kawakami et al.

[11] Patent Number: 4,910,086

[45] Date of Patent: Mar. 20, 1990

[54] RESIN COATED METAL BODY

[75] Inventors: Yukichika Kawakami; Yoshikatsu Satake; Zenya Shiiki, all of Iwaki, Japan

[73] Assignee: Kureha Kagaku Kogyo K.K., Tokyo, Japan

[21] Appl. No.: 286,753

[22] Filed: Dec. 21, 1988

[30] Foreign Application Priority Data

Dec. 25, 1987 [JP] Japan ................................ 62-326690
Nov. 10, 1988 [JP] Japan ................................ 63-282579

[51] Int. Cl.$^4$ ........................ B32B 15/08; B32B 27/06
[52] U.S. Cl. .................................... 428/419; 428/457; 428/460
[58] Field of Search ........................ 428/457, 419, 460; 524/609; 528/226, 388; 526/262

[56] References Cited

U.S. PATENT DOCUMENTS

| | | | |
|---|---|---|---|
| 4,590,104 | 5/1986 | Zeiner et al. | 427/389.9 |
| 4,690,972 | 9/1987 | Johnson et al. | 524/609 |
| 4,698,415 | 10/1987 | Sinclair et al. | 528/388 |
| 4,716,212 | 12/1987 | Gaughan | 528/226 |
| 4,745,167 | 5/1988 | Iizuka et al. | 526/262 |

FOREIGN PATENT DOCUMENTS

| | | |
|---|---|---|
| 270955 | 6/1988 | European Pat. Off. |
| 274754 | 7/1988 | European Pat. Off. |
| 3405523 | 8/1985 | Fed. Rep. of Germany |
| 13347 | 7/1972 | Japan |
| 58435 | 4/1985 | Japan |
| 104126 | 6/1985 | Japan |
| 221229 | of 1986 | Japan |
| 61-14228 | 1/1986 | Japan |

OTHER PUBLICATIONS

Indian J. Chem., vol. 21A, May 1982, pp. 501-502.

Indian Journal of Pure and Applied Physics, vol. 22, Apr. 1984, pp. 247-248.
Mol. Cryst. Liq. Cryst., vol. 83, 1982, pp. 229-238.

Primary Examiner—Thomas J. Herbert
Attorney, Agent, or Firm—Lowe, Price, LeBlanc, Becker & Shur

[57] ABSTRACT

A coated metal body having a metal base or a metal base having an undercoat of an inorganic and/or organic material and at least one coating layer formed on the metal base or the undercoat to a thickness of 5–1,000 μm with a poly(arylene thioether-ketone) resin coating material. The resin coating material is formed of 100 parts by weight of a poly(arylene thioether-ketone), 0–400 parts by weight of a thermoplastic resin and/or thermosetting resin compatible with the poly(arylene thioether-ketone) and 0–150 parts by weight, per 100 pars by weight of the sum of the resin components, of at least one filler selected from fibrous fillers, inorganic fillers and metallic fillers. The poly(arylene thioether-ketone) contains predominant recurring units of the formula

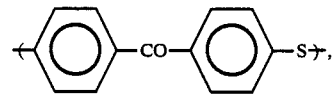

wherein the —CO— and —S— are in the para position to each other, and has a melting point, Tm of 310°–380° C., a melt crystallization temperature, Tmc (420° C./10 min) of at least 210° C., a residual melt crystallization enthalpy, ΔHmc (420° C./10 min) of at least 10 J/g, and a reduced viscosity of 0.2-2 dl/g as determined by viscosity measurement at 25° C. and a polymer concentration of 0.5 g/dl in 98 percent by weight sulfuric acid.

11 Claims, No Drawings

RESIN COATED METAL BODY

FIELD OF THE INVENTION

This invention relates to a coated metal body comprising a metal base and a poly(arylene thioetherketone) (hereinafter abbreviated as "PTK") resin coating material coated on the metal base, and more specifically to a heat-resistant coated metal body comprising, aluminum, iron, titanium, chromium, nickel or an alloy containing one or more of these metals as a base material and a melt-stable PTK resin coating material applied thereon and having substantially no pinholes, high smoothness and high peeling strength.

BACKGROUND OF THE INVENTION

With the recent advancement of the industry and technology, there is an ever-increasing demand for the development of a coating material equipped with sufficient heat resistance, chemical resistance and corrosion resistance to permit its use even in an ultimate environment. Poly(p-phenylene thioether) (hereinafter abbreviated as "PPTE"), a kind of poly(arylene thioether), has conventionally been used as a coating material by making use of its characteristic properties such as high corrosion resistance, high chemical resistance and good adhesion properties. However, PPTE has a melting point not higher than about 285° C. and is still dissatisfactory in heat resistance for applications such that it is used for a long period of time in a high-temperature environment of 300° C. or higher for instance.

Polyether ether ketone (hereinafter abbreviated as "PEEK") and polyether ketone (hereinafter abbreviated as "PEK") have recently been developed as heat-resistant resins. These resins have melting points of about 300° C. or higher and moreover, they are crystalline thermoplastic resins.

PEEK and PEK however use expensive fluorine-substituted aromatic compounds as their raw materials. They hence involve such problems that they are costly and their use is limited for economical reasons.

Based on an assumption that PTK could be a promising candidate for heat-resistant thermoplastic resin like PEEK and PEK owing to their similarity in chemical structure, PTK has been studied to some extents to date.

There are some disclosure on PTKs, for example, in German Offenlegungsschrift 34 05 523A1 (hereinafter abbreviated as "Publication A"), Japanese Pat. Laid-Open No. 58435/1985 (hereinafter abbreviated as "Publication B"), Japanese Pat. Laid-Open No. 104126/1985 (hereinafter abbreviated as "Publication C"), Japanese Pat. Laid-Open No. 13347/1972 hereinafter abbreviated as "Publication D"), Indian J. Chem., 21A, 501–502 (May, 1982) (hereinafter abbreviated as "Publication E"), Japanese Pat. Laid-Open No. 221229/1986 (hereinafter abbreviated as "Publication F"), and U.S. Pat. No. 4,716,212 (hereinafter abbreviated as "Publication G").

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

It was attempted to produce some molded or formed products in Publications A and B. Since these PTKs had poor melt-stability, certain specified types of molded or formed products were only obtained by a special molding or forming process, where PTKs were used only as a sort of binder, being impregnated into a great deal of reinforcing fibers of main structural materials and molded or formed under pressure.

Since conventional PTKs obtained by any of the production processes disclosed to date had low melt-stability, they tended to undergo decomposition, foaming, uneven curing or the like when employed to coat a metal base so as to form a fusion-coated layer thereon. It was hence difficult to form on a base material a fusion-coated uniform layer containing little defects such as pinholes and having high smoothness and sufficient peeling strength.

OBJECTS AND SUMMARY OF THE INVENTION

An object of this invention is to overcome the above-described drawbacks of the conventional techniques and to obtain a heat-resistant coated metal body, which contains substantially no pinholes and has high smoothness and peeling strength, by using PTK as a coating material.

Incidentally, the present inventors carried out an extensive investigation with a view toward developing PTK excellent in melt stability. As a result, it has been found that PTK, whose melt stability upon melting has been drastically improved, can be obtained by using economical 4,4'-dihalobenzophenone such as 4,4'-dichlorobenzophenone and/or 4,4'-dibromobenzophenone as a raw material, ingeniously modifying the polymerization, namely, increasing the water content in the polymerization system to an extremely high level, and conducting the polymerization in a system free of any polymerization aid while paying attention to the selection of the charge ratio of the monomers, the shortening of the reaction time at high temperatures, the selection of a material for a polymerization reactor, and if necessary, by conducting a stabilization treatment in a final stage of the polymerization (Japanese Pat. Application No. 109916/1988). The thus-obtained PTK will hereinafter be called "melt-stable PTK".

It has also been found that the melt stability at the time of melt processing can be improved further by adding a basic compound such as the hydroxide or oxide of a Group I or II metal of the periodic table to the melt-stable PTK (Japanese Pat. Application No. 142772/1988).

The melt-stable PTK thus obtained has a high melting point. Especially, the melting point of the homopolymer is extremely high, i.e., as high as about 360° C.

The present inventors thus attempted to coat a metal base with the melt-stable PTK. As a result, the melt-stable PTK has been found to be able to form a heat-resistant coating layer containing substantially no pinholes and having high smoothness and peeling strength. The present invention has now been completed on the basis of these findings.

In one aspect of this invention, there is thus provided a coated metal body comprising a metal base or a metal base having an undercoat of an inorganic and/or organic material and at least one coating layer formed on the metal base or the undercoat to a thickness of 5–1,000 μm with a poly(arylene thioether-ketone) resin coating material, said resin coating material comprising:

(A) 100 parts by weight of a poly(arylene thioether-ketone) having predominant recurring units of the formula

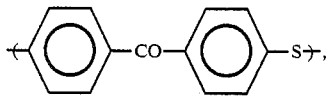

wherein the —CO— and —S— are in the para position to each other, and having the following physical properties (a)-(c):

(a) melting point, Tm being 310–380° C.;
(b) melt crystallization temperature, Tmc (420° C./10 min) being at least 210° C. and residual melt crystallization enthalpy, ΔHmc (420° C./10 min) being at least 10 J/g, wherein Tmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.; and
(c) reduced viscosity being 0.2–2 dl/g as determined by viscosity measurement at 25° C. and a polymer concentration of 0.5 g/dl in 98 percent by weight sulfuric acid;

(B) 0–400 parts by weight of a thermoplastic resin and/or a thermosetting resin compatible with the poly(arylene thioether-ketone); and (C) 0–150 parts by weight, per 100 parts by weight of the sum of the poly(arylene thioether-ketone) and the thermoplastic resin and/or thermosetting resin, of at least one filler selected from fibrous fillers, inorganic fillers and metallic fillers.

In addition, the present invention also embraces coated metal bodies making use of a metal base which has as an undercoat a PTK resin coating layer containing mica powder.

DETAILED DESCRIPTION OF THE INVENTION

Structure of Coated Metal Body

The coated metal body according to this invention contains at least one PTK resin coating layer of 5–1,000 μm thick on a metal base material.

The PTK resin coating material is, as will be described subsequently, a melt-stable PTK or a composition containing the melt-stable PTK. The composition which forms the PTK resin coating material is obtained by mixing one or more other thermoplastic resin and thermosetting resins and/or fillers with the PTK as desired with a view toward modifying and improving various physical properties of the resulting coating layer of the melt-stable PTK, for example, mechanical properties, electrical properties, thermal properties and chemical properties, modifying and improving the processability and reducing the cost.

The coated metal body according to this invention has a uniform melt-coated film of the PTK resin coating material. Included as coated metal bodies according to this invention are those with a single layer of the PTK resin coating material, those with plural layers of PTK resin coating materials having different compositions and those with a coating layer other than that of a PTK resin coating material, for example, with one or more of various resin layers and inorganic material layers (ceramic layers, glass layers, cermet layers, etc.) as undercoats.

(Melt-Stable PTK)

Chemical structure of PTKs:

The melt-stable PTKs useful in the present invention are poly(arylene thioether-ketones) (PTKs) having predominant recurring units of the formula

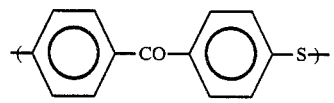

wherein the —CO— and —S— are in the para position to each other.

In order that a melt-stable PTK employed in this invention can provide a heat-resistant coating layer usable even in a high-temperature environment as high as 300° C. or higher, the above recurring units should account more than 50 wt.%, more preferably at least 60 wt.%, and most preferably at least 70 wt.%. If the proportion of the recurring units is 50 wt.% or less, there is a potential problem that the crystallinity is reduced and the heat resistance is reduced correspondingly.

Exemplary recurring units other than the above recurring units may include:

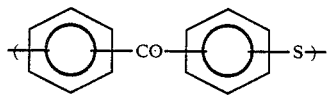

(except for the recurring unit in which the —CO— and —S— are in the para position to each other.);

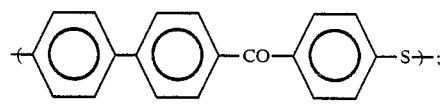

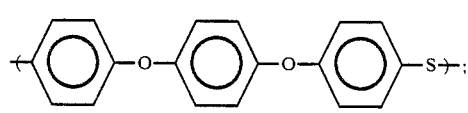

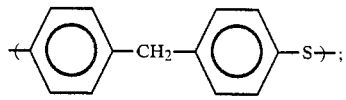

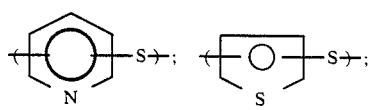

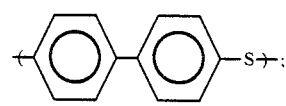

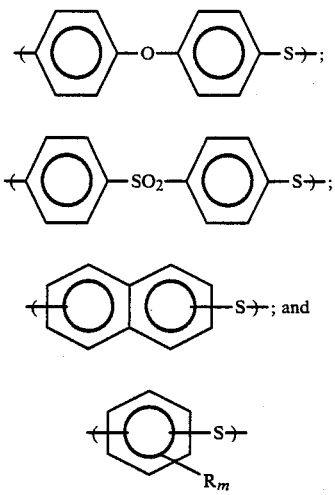

(wherein R means an alkyl group having 5 or less carbon atoms and m stands for an integer of 0–4.).

As a melt-stable PTK for the PTK resin coating material useful in the practice of this invention, the melt-stable PTK may preferably be an uncured polymer with an uncured linear polymer being desired.

The term "cure" as used herein means a molecular-weight increasing treatment of the polymer by a method other than a usual polycondensation reaction, for example, by a crosslinking, branching or molecular-chain extending reaction, particularly, a molecular-weight increasing treatment by a high-temperature heat treatment or the like. The term "uncured polymer" as used herein means a polymer not subjected to a post treatment such that curing is effected in an attempt of increasing the molecular weight of the polymer and increasing its melt viscosity.

In general, "curing" causes a PTK to lose or decrease its flowability, melt stability and crystallinity. Curing therefore makes difficult the uniform melt coating of a PTK to a base material and even if a coating layer of the PTK is formed, the resultant coating layer tends to have a low density and to contain many pinholes and blisters. Curing is hence not preferred.

PTKs having a partially crosslinked and/or branched structure to such an extent not impairing the uniform melt coatability are also acceptable as PTKs usable in the present invention. For example, PTKs obtained by conducting polymerization in the presence of a small amount of a crosslinking agent, e.g., polychlorobenzophenone, polybromobenzophenone or the like and PTKs subjected to mild curing are acceptable as PTKs usable in this invention.

Physical properties of PTK:

PTKs useful in this invention have the following physical properties.

(a) As a characteristic property of a heat-resistant polymer, its melting point, Tm ranges from 310 to 380° C.

(b) As a characteristic feature of the melt stability of the polymer in a molten state, its melt crystallization temperature, Tmc (420° C./10 min) is at least 210° C. and its residual melt crystallization enthalpy, ΔHmc (420° C./10 min) is at least 10 J/g.

Similarly, as a characteristic feature of the melt stability of the polymer in its molten state, the melt viscosity increment in terms of times, $\eta^*(385°$ C./30 min$)/\eta^*(385°$ C./5 min$)$ is 10 or smaller.

Further, as a characteristic feature of the melt stability of the polymer in its molten state, the melt viscosity increment in terms of times of a product obtained by adding 0.3 part by weight of calcium hydroxide to 100 parts by weight of the PTK, $\eta^*(380°$ C./30 min$)/\eta^*(380°$ C./5 min$)$ is desirably 5 or smaller.

(c) As a characteristic property of a crystalline polymer, the density of the polymer obtained in a crystallized form by annealing it at 280° C. for 30 minutes is at least 1.34 g.cm/$^3$ at 25° C.

(d) As a characteristic property of a polymer capable of easily forming a uniform melt coating layer of sufficient mechanical strength, the reduced viscosity is within the range of 0.2–2 dl/g as determined by viscosity measurement at 25° C. and a polymer concentration of 0.5 g/dl in 98 percent by weight sulfuric acid.

Next, the characteristic properties of the melt-stable PTK will be described.

(1) Heat resistance:

The melting point, Tm of a polymer serves as an index of the heat resistance of the polymer.

The PTK useful as the PTK resin coating material in the present invention has a melting point, Tm of 310–380° C., preferably 320–375° C., more preferably 330–370° C. Those having a melting point, Tm less than 310° C. are insufficient in heat resistance. In the case of those having a melting point, Tm exceeding 380° C. on the other hand, it is difficult to form a uniform melt coating layer without decomposition. Such an excessively low or high melting point is undesired.

(2) Melt stability:

The greatest feature of the PTK employed in the coating layer of the coated metal body according to this invention is that it has high melt stability upon formation of a melt coating film having no pinholes and it hence permits easy formation of a uniform melt coating layer. Since conventional PTKs are all low in melt stability, they tend to undergo deterioration of flowability due to rapid curing, foaming by decomposition and embrittlement due to decomposition upon formation of a melt coating film. It is therefore difficult to form a uniform melt coating layer of little defects and high peeling strength by using such conventional PTKs.

It is hence possible to obtain an index of the melt stability of a PTK upon its melting by investigating the residual crystallinity and melt viscosity increment, in terms of times, of the PTK after holding it at an elevated temperature of its melt processing temperature or higher for a predetermined period of time.

The residual crystallinity can be evaluated quantitatively by measuring the melt crystallization enthalpy with a differential scanning calorimeter (hereinafter abbreviated as "DSC").

Specifically, the melt crystallization temperature, Tmc (420° C./10 min) and the residual melt crystallization enthalpy, ΔHmc (420° C./10 min) of the PTK as determined at a cooling rate of 10° C./min after the PTK is held at 50° C. for 5 minutes in an inert gas atmosphere, heated to 420° C. at a rate of 75° C./min, and then held for 10 minutes at 420° C. (a high temperature of at least the melt processing temperature) can be used as measures of its melt stability.

The melt-stable PTK useful for the PTK resin coating material in the present invention is a polymer whose melt crystallization temperature, Tmc (420° C./10 min) is preferably at least 210° C., more preferably at least 220° C., most preferably at least 230° C. and whose residual melt crystallization enthalpy, ΔHmc (420° C./10 min) is preferably at least 10 J/g, more preferably at least 15 J/g, most preferably at least 20 J/g.

A PTK, whose Tmc (420° C./10 min) is below 210° C. and whose ΔHmc (420° C./10 min) is less than 10 J/g, tends to lose its crystallinity or to induce a melt viscosity increase upon its melt processing, so that difficulties are encountered upon formation of a substantially defect-free, high-density, uniform melt coating layer. Most of the conventionally-known PTKs are such polymers.

The melt viscosity increment in terms of times, for example, the increment in terms of times of the viscosity of a PTK when the PTK is held for different periods of time at 385° C. (a high temperature of at least its melting point) can be used as an index of its melt stability.

As a PTK usable as a PTK resin coating material in this invention, its melt viscosity increment in terms of times, $\eta^*(385°\ C./30\ min)/\eta^*(385°\ C./5\ min)$ may be preferably 10 or smaller, more preferably 5 or smaller, and most preferably 3 or smaller. Here, $\eta^*(385°\ C./30\ min)$ and $\eta^*(385°\ C./5\ min)$ are the melt viscosities of the PTK when measured at 385° C. and a shear rate of 1200 sec$^{-1}$ after holding the PTK at 385° C. for 30 minutes and 5 minutes respectively.

Where the melt viscosity increment exceeds 10 in terms of times, it is difficult to form a uniform, high-density melt coating layer of little defects. Most of the conventionally-known PTKs are such polymers.

In addition, as a PTK employed as a PTK resin coating material in this invention, it is desirable for the formation of a uniform, high-density melt coating layer of little defects to use a PTK such that when 0.3 part by weight of calcium hydroxide is added to 100 parts by weight of the PTK, the resultant product has a melt viscosity increment in terms of times, $\eta^*(380°\ C./30\ min)/\eta^*(380°\ C./5\ min)$ of 5 or smaller, preferably 3 or smaller, most preferably 2 or smaller. Here, $\eta^*(380°\ C./30\ min)$ and $\eta^*(380°\ C./5\ min)$ are the melt viscosities of the product when measured at 380° C. and a shear rate of 1200 sec$^{-1}$ after holding the product at 380° C. for 30 minutes and 5 minutes respectively. Incidentally, calcium hydroxide is added to reduce variations in melt viscosity and to ensure the reproducibility of each measurement datum.

(3) Crystallinity:

As an index of the crystallinity of a polymer, its density is used as done so routinely.

The PTK used in the present invention is desirably a polymer whose density (at 25° C.) is preferably at least 1.34 g/cm$^3$, more preferably at least 1.35 g/cm$^3$ when measured in a form crystallized by annealing it at 280° C. for 30 minutes. Those having a density less than 1.34 g/cm$^3$ in a crystallized form have potential problems that they may have low crystallinity and hence insufficient heat resistance as heat-resistant polymers. There is an additional potential problem that a pinhole-free, dense melt coating film may not be formed easily.

In particular, PTK cured to a high degree (e.g., the PTK described in Publication B) has lost its crystallinity to a marked extent and its density is generally far lower than 1.34 g/cm$^3$.

(4) Molecular weight:

The solution viscosity, for example, reduced viscosity, $\eta_{red}$ of a polymer can be used as an index of its molecular weight.

As a PTK to be used in this invention, it may desirably be a high molecular-weight PTK whose reduced viscosity, $\eta_{red}$ is preferably 0.2–2 dl/g, more preferably 0.3–2 dl/g, most preferably 0.5–2 dl/g. Incidentally, reduced viscosity, $\eta_{red}$ as used herein is indicated by a value as determined by viscosity measurement at 25° C. and a polymer concentration of 0.5 g/dl in 98 percent by weight sulfuric acid. Since a PTK whose $\eta_{red}$ is less than 0.2 dl/g has a low melt viscosity and high tendency of giving PTK resin coating layers having insufficient mechanical strength, such a PTK is not preferred. On the other hand, a PTK whose $\eta_{red}$ exceeds 2 dl/g is not preferred either since difficulties are encountered in forming a uniform melt coating layer.

Production of PTK resin:

The melt-stable PTK used as a PTK resin coating material in the present invention can be produced, for example, by subjecting an alkali metal sulfide and a dihalogenated aromatic compound, preferably, dichlorobenzophenone and/or dibromobenzophenone to polymerization, for a short period of time, in the substantial absence of a polymerization aid (a salt of a carboxylic acid, or the like), in an aprotic polar organic solvent, preferably, an organic amide solvent (including a carbamic amide or the like) and in a system having a water content far higher compared with polymerization processes of the prior art while controlling the temperature profile suitably, and if necessary, by choosing the material of a reactor suitably.

Namely, the melt-stable PTK useful in the practice of the present invention can be produced suitably by causing an alkali metal sulfide and a dihalogenated aromatic compound consisting principally of 4,4'-dichlorobenzophenone and/or 4,4'-dibromobenzophenone to undergo a dehalogenation or sulfuration reaction under the following conditions (a)-(c) in an organic amide solvent.

(a) the ratio of the water content to the amount of the charged organic amide solvent being 2.5–15 (mole/kg);

(b) the ratio of the amount of the charged dihalogenated aromatic compound to the amount of the charged alkali metal sulfide being 0.95–1.2 (mole/mole); and (c) the reaction temperature being 60–300° C. with a proviso that the reaction time at 210° C. and higher is within 10 hours.

The melt-stable PTK can be obtained more suitably when a reactor at least a portion of which, said portion being brought into contact with the reaction mixture, is made of a titanium material.

If desired, the dihalogenated aromatic compound may be charged in an excess amount relative to the alkali metal sulfide, preferably, a portion of the dihalogenated aromatic compound is charged and polymerized in a final stage of the polymerization, or at least one halogen-substituted aromatic compound having at least one substituent group having electron-withdrawing property at least equal to —CO— group (preferably, 4,4'-dichlorobenzophenone and/or 4,4'-dibromobenzophenone employed as a monomer) may be added and reacted (as a stabilization treatment in a final stage of the polymerization), whereby a PTK improved still further in melt stability can be obtained.

(Thermoplastic Resin and Thermosetting Resin)

The PTK resin coating material useful in the practice of this invention may contain thermoplastic resin and/or thermosetting resin, which is compatible with the PTK, in a total proportion of 0–400 parts by weight, preferably 0–200 parts by weight, more preferably 0–90 parts by weight per 100 parts by weight of the PTK.

If the total proportion of the thermoplastic resin and/or thermosetting resin exceeds 400 parts by weight, there is a possible problem that the resulting coating layer may not have sufficient heat resistance as a heat-resistant coating layer.

As exemplary thermoplastic and thermosetting resins useful in the present invention, may be mentioned resins such as poly(arylene thioethers), Polyether ether ketones, polyether ketones, polyamides (including Aramids), polyamide imides, polyimides, polyesters (including aromatic polyesters and liquid crystalline polyesters), polysulfones, polyether sulfones, polyether imides, polyarylenes, polyphenylene ethers), polycarbonates, polyester carbonates, polyacetals, fluoropolymers, polyolefins, silicone resins, epoxy resins, phenol resins and furan resins; as well as elastomers such as fluororubbers, silicone rubbers, olefin rubbers, acrylic rubbers, polyisobutylenes (including butyl rubber), hydrogenated SBR, polyamide elastomers and polyester elastomers.

Among the above-exemplified resins, poly(arylene thioethers), especially, poly(arylene thioethers) having predominant recurring units of the formula

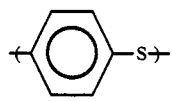

(hereinafter abbreviated as "PATE") can improve the room-temperature mechanical properties of the PTK compositions over those of the PTK alone and the heat resistance of the PTK compositions over those of PATE alone when blended with the PTK, and resin coating layers well-balanced in heat resistance and mechanical properties can be obtained.

(Filler)

Each PTK resin coating material useful in the practice of this invention may contain at least one filler selected from fibrous fillers, inorganic fillers and metallic fillers. Such a filler may be added in a proportion of 0–150 parts by weight, preferably 1–100 parts by weight, more preferably 10–80 parts by weight, per 100 parts by weight of the PTK or the sum of the PTK and the thermoplastic resin and/or thermosetting resin. If the proportion of the filler exceeds 150 parts by weight, there is a potential problem that pinholes tend to occur in a coating layer to be obtained. Such a large proportion is therefore not preferred.

As exemplary fibrous fillers, may be mentioned short fibers (including whiskers) such as glass fibers, carbon (including graphite) fibers, silica fibers, alumina fibers, zirconia fibers, silicon carbide fibers, Aramid fibers, potassium titanate fibers, calcium silicate (including wollastonite) fibers, calcium sulfate fibers, silicon nitride fibers and boron fibers. In particular, as a fibrous filler, short fibers such as glass fibers, carbon fibers, potassium titanate fibers or calcium silicate fibers are preferred from the viewpoints of physical properties and economy.

As exemplary inorganic fillers, may be mentioned mica powder, talc powder, kaolin powder, clay powder, bentonite powder, diatomaceous earth powder, silica powder, alumina powder, silica-alumina powder, titanium oxide powder, iron oxide powder, chromium oxide powder, magnesium oxide powder, calcium carbonate powder, calcium silicate powder, potassium silicate powder, sodium silicate powder, calcium phosphate powder, potassium phosphate powder, sodium phosphate powder, aluminum phosphate powder, zinc phosphate powder, calcium sulfate powder, magnesium carbonate powder, magnesium phosphate powder, barium sulfate powder, silicon powder, carbon (including graphite) powder, silicon nitride powder, molybdenum disulfide powder, low melting glass powder, ceramic powder, frit powder, hydrotalcite powder, ferrite powder and cobalt powder. Especially, a PTK resin composition filled with mica is preferred as an undercoat for reducing the difference in coefficient of linear expansion between a metal base and a coating layer.

As exemplary metallic fillers, may be mentioned flakes and powders of aluminum, zinc, copper and silver.

(Other Optional Components)

Each PTK useful in the coating material for the coated metal body according to this invention or each composition thereof may also be added with small amounts of curing accelerator or decelerator, stabilizer, colorant, mold releasing agent and/or the like.

In particular, a zinc compound is preferred as a scavenger for corrosive gases.

(Metal Base)

The coated metal body of this invention uses a metal as a base material. The base material may be any one of various metal bases or a metal base with an undercoat formed in advance with an inorganic material and/or an organic material.

As metals usable as base materials, aluminum, iron, titanium, chromium, nickel, and alloys containing at least one of these metals, for example, duralumin, carbon steel and stainless steel are preferred from the viewpoint of heat resistance, corrosion resistance, adhesion properties, mechanical characteristics, economy and the like.

Illustrative examples of the undercoat may include inorganic material layers such as ceramic layers, glass layers and cermet layers as well as resin layers of the same kind as the coating layer or of a kind different from the coating layer. The undercoat can be provided as an optional element for purposes such as reducing the difference in coefficient of linear expansion between the metal base and the coating layer, improving the adhesion between the metal base and the coating layer, preventing corrosion of the metal base during its coating treatment and/or preventing the peeling of the coating layer by steam.

A PTK can also be chosen as an undercoat. In particular, an undercoat having a thickness of 5–300 μm and formed of a PTK composition, which contains 10–300 parts by weight of mica or at least one kind of short fibers (including whiskers) selected from the group consisting of glass fibers, carbon fibers, calcium silicate fibers and potassium titanate fibers per 100 parts by weight of the PTK, is effective for reducing the difference in coefficient of linear expansion between the metal base and the PTK resin coating layer and/or for preventing peeling of the PTK resin coating layer by steam. When a PTK is used as an undercoat, its formation can be used in the same manner as the following coating-layer forming process.

Forming process of coating layer

The coated metal body of this invention can be obtained by forming, on a metal base, at least one coating layer with a coating material which is a PTK alone or a composition of a PTK, one or more other resins and one or more fillers. The forming process of the PTK resin coating layer comprises at least the following Step A and Step B. If necessary, the following Step C and Step D may be either interposed or added.

Step A—Pretreatment of the metal base.
Step B—Coating with powder of the PTK resin coating material, followed by melt-coating; and if necessary, subsequent curing.
Step C—Formation of the undercoat, which may be conducted after Step A but before Step B.
Step D—Formation of an intermediate layer and/or a topcoat in addition to the PTK resin coating layer, which may be conducted between Steps B or after Step B.

Each of the above steps will hereinafter be described.

(Step A)

The pretreatment step of the metal base is conducted prior to the formation of the coating layer in order to assure full adhesion between the metal base and the coating layer. This step generally comprises (i) cleaning, (ii) surface roughening or (iii) surface modification, or a combination thereof.

(i) The cleaning is a surface cleaning treatment. It can be effected by a cleaning treatment with a detergent, a solvent, an acid or an alkali, or a removal treatment of rust or burrs with a derusting agent, by a physical method (sand blasting, honing or the like) or a high-temperature heating treatment.

(ii) Surface roughening is conduct to apply a suitable degree of ruggedness to the surface. It can be effected, for example, by a chemical roughening treatment with an oxidizing agent or by electrolytic oxidation or by a physical method (sand blasting, honing or the like).

(iii) Surface modification is applied to modify chemical properties of the metal base in order to improve the adhesion of the metal base to the coating layer. It can be effected, for example, by a surface oxidation treatment (e.g., with an oxidizing agent, or by electrolytic oxidation or high-temperature oxidation), a surface-nitriding treatment, or a surface-hydroxylating treatment (by steaming).

(Step B)

The step in which powder of the PTK resin coating material is coated, molten and if necessary, cured is the most important step in the production of the coated metal body.

As methods for conducting this step, may be mentioned for example, by way of slurry coating, powder coating, fluidized bed coating and electrostatic coating.

(i) Slurry coating:

The melt-stable PTK resin coating material, which is in the form of a powder having an average particle size of 0.1–200 $\mu$m, preferably 0.5–100 $\mu$m, more preferably 1–50 $\mu$m, is used as a slurry dispersed in a liquid dispersing medium composed of water and/or an organic solvent.

A metal base which may have an undercoat formed in advance thereon is coated with the slurry, for example, by applying the slurry with a brush or roller or spraying the slurry, or on the contrary by dipping the metal base in the slurry. Either after drying the thus-applied coating layer or without drying it, the coating layer is heated at 310–500° C., preferably, 350–470° C. for 1 minute to 20 hours, preferably, 5 minutes to 10 hours, so that a uniform melt coating layer of the PTK resin coating material can be formed to a thickness of 5–300 $\mu$m, preferably, 10–200 $\mu$m on the metal base or on the undercoat of the metal base where the metal base has the undercoat.

(ii) Powder coating and (iii) fluidized bed coating:

A powder of the melt-stable PTK resin coating material, whose average particle size is 1–500 $\mu$m preferably, 5–300 $\mu$m is used as is in these coating processes. A metal base which may have an undercoat formed thereon is first heated to 310–500° C., preferably, 350–470° C. The powder is sprayed by a spray gun or the like against the metal base or the undercoat of the metal base where the metal base has the undercoat, so that the powder is melt-coated on the metal base or undercoat (powder coating). In contrast, the metal base which may have the undercoat and has been heated to a temperature in the above range is immersed in a fluidized bed of the powder so that the powder is melt-coated on the metal base or undercoat (fluidized bed coating). By heating the thus-applied coating layer at 310–500° C., preferably, 350–470° C. for 1 minute to 20 hours, preferably, 5 minutes to 10 hours, a uniform melt coating layer up the PTK resin coating material can be formed to a thickness of 5–1,000 $\mu$m, preferably 50–800$\mu$m, most preferably 70–500$\mu$m.

(iv) Electrostatic coating:

A powder of the melt-stable PTK resin coating material, whose average particle size is 1–500$\mu$m, preferably, 5–300 $\mu$m is used in this coating process. The powder is applied with either positive or negative charges, while a metal base which may have an undercoat and is to be coated is applied with a potential opposite to the charges. By using a Coulomb force, the metal base or the undercoat of the metal base where the metal base has the undercoat is coated with the powder. By heating the thus-applied coating layer at 310–500° C., preferably, 350–470° C. for 1 minute to 20 hours, preferably, 5 minutes to 10 hours, a uniform melt coating layer of the PTK resin coating material can be formed to a thickness of 5–1,000 $\mu$m, preferably 50–800$\mu$m, most preferably 70–500$\mu$m.

Incidentally, a thicker coating layer can be easily formed provided that prior to the electrostatic coating of the powder, the metal base which may have the undercoat is heated to 310–500° C.

(Step C)

Although an undercoat is not essential, it may be applied optionally for purposes such as reduction of the difference in coefficient of linear expansion between the metal base and the coating layer, improvement in the adhesion between the metal base and the coating layer, prevention of corrosion of the metal base upon its coating treatment and prevention of peeling of the coating layer by steam as described above.

The undercoat should be formed prior to the formation of any other coating layer or layers.

(Step D)

Depending on the application purpose of the coated metal body, a coating layer of a kind different from the layer of the PTK resin coating material and the undercoat may be applied additionally as an intermediate coating layer or a topcoat.

When the coated metal body of this invention is employed as a non-sticking cookware or the like by way of example, it is effective to form as a topcoat a coating layer of a fluoroplastic or fluorinated resin composition.

[Utility]

Coated metal body according to this invention, which has a coating layer of a PTK resin coating material, can be used in a wide variety of industrial fields where both heat resistance and strength are required, for example, as pipings, reaction equipment, liquid transportation devices and tanks for chemical plants; housings, components and parts and insulating materials for electronic and electrical equipment; exterior trims and structural materials for automotive vehicles, aircraft and rockets; exterior trims, structural materials, components and parts for stoves, portable cooking stoves, ovens, ranges, grills and stacks; and cooking utensils and containers.

ADVANTAGES OF THE INVENTION

The present invention has therefore made it possible to economically provide a coated metal body which can be used in a high-temperature environment as high as 300° C. or higher, is excellent in heat resistance, chemical resistance, corrosion resistance and peeling resistance, contains little defects such as pinholes, and has a smooth coating layer.

EMBODIMENTS OF THE INVENTION

The present invention will hereinafter be described more specifically by the following Experiments and Examples. It should however be borne in mind that the present invention is not limited to the following Experiments and Examples only.

(EXPERIMENTS)

Synthesis Experiment 1: (Synthesis of Melt-Stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 53.5 wt.%; product of Sankyo Kasei Co., Ltd.) and 90 kg of N-methylpyrrolidone (hereinafter abbreviated as "NMP") (water content/NMP =5 moles/kg). After the reactor being purged with nitrogen gas, the resultant mixture was heated from room temperature to 240° C. over 1.2 hours and then maintained at 240° C. for 1.8 hours. In order to apply a stabilization treatment in a final stage of the polymerization, the reaction mixture was then heated to 260° C. over 0.5 hour while charging under pressure a mixture composed of 5.0 moles of DCBP, 20 kg of NMP and 100 moles of water. The resultant mixture was maintained further at 260° C. for 1.0 hour to react them.

The reactor was cooled, and the reaction mixture in the form of a slurry was taken out of the reactor and was then poured into about 200 l of acetone, whereby the resultant polymer was caused to precipitate. The polymer was recovered by filtration, and then washed three times with acetone and three times with water. Acetone and water were removed to obtain the polymer in a wet form. The wet polymer was dried at 80° C. for 12 hours under reduced pressure, thereby obtaining Polymer $P_1$ as an ivory powder.

Synthesis Experiment 2: (Synthesis of Melt-Stable PTK)

Polymerization was conducted in the same manner as in Synthesis Experiment 1 except that 90 moles of DCBP and 0.3 mole of p-dibromobiphenyl were used in place of 90 moles of DCBP. The reaction mixture in the form of a slurry was then processed in the same manner as in Synthesis Experiment 1, whereby Polymer $P_2$ was obtained as an ivory powder.

Synthesis Experiment 3: (Synthesis of Conventional PTK)

A reactor made of SUS 316 was charged with 1.0 mole of sodium sulfide trihydrate, 800 ml of NMP and 1.0 g of sodium hydroxide. The resulting mixture was heated up to 210° C., whereby 42 g of distilled water containing 3 g of NMP was obtained. The residue was then cooled to about 45° C. Under vigorous stirring, 1.0 mole of 4,4'-difluorobenzophenone and 0.033 mole of sodium sulfite were added (water content/NMP=0.9 mole/kg). The reaction system was pressurized to 5 atm with nitrogen gas, and the contents were maintained at 250° C. for 4 hours to polymerize them. After the reaction, the reactor was cooled to 100° C., and the reaction mixture in the form of a slurry was taken out. The resulting polymer was separated and then washed with hot water and acetone separately and repeatedly. After sufficient washing of the polymer, it was dried fully to obtain Polymer $R_1$ as a yellowish brown powder.

Synthesis Experiment 4: (Synthesis of Conventional PTK)

A reactor made of SUS 316 was charged with 10 moles of sodium sulfide nonahydrate, 5.0 l of NMP and 10 moles of lithium acetate. The resultant mixture was heated up to 200° C. under a nitrogen gas stream to remove water therefrom, whereby 1580 g of distilled aqueous solution containing 104 g of NMP was obtained. After cooling the reaction system to 120° C., a solution of 10 moles of DCBP and 0.8 l of NMP was charged (water content/NMP =1.4 moles/kg). The thus-obtained mixture was maintained, under stirring and nitrogen gas pressure, at 230° C. for 2 hours and then at 250° C. for 1 hour so as to polymerize them.

After the polymerization reaction, the reaction mixture in the form of a slurry was poured into water. A polymer thus precipitated was washed with water and acetone separately and repeatedly, and was then dried to obtain Polymer $R_2$ as a brown powder.

A portion of Polymer $R_2$ was heated at 250° C. for two hours in air, thereby obtaining Polymer $R_{2C}$ in the form of a cured black powder.

Incidentally, Polymers $R_1$, $R_2$ and $R_2C$ were prepared by following the processes disclosed in Publications A, B and B respectively. They were provided as exemplary PTKs according to the prior art. <Measuring Methods of Physical Properties>

MEASUREMENT OF MELTING POINT:

With respect to each of the PTK thus obtained, the melting point, Tm was measured as an index of its heat resistance. The measurement was performed in the following manner. About 10 mg of each PTK (powder) was weighed. Using a DSC (Model TC 10A; manufactured by Mettler Company), the sample was held at 50° C. for 5 minutes in an inert gas atmosphere, and was then heated up at a rate of 10° C./min so as to measure its melting point. Results are collectively shown in Table 1.

Measurements of melt crystallization temperature and residual melt crystallization enthalpy:

With respect to each of the PTKs obtained in the Synthesis Experiments, the melt crystallization peak temperature, Tmc (420° C./10 min) and residual melt crystallization enthalpy, ΔHmc (420° C./10 min) were measured.

Namely, the temperature corresponding to a peak of melt crystallization measured by the DSC was represented by Tmc (420° C./10 min) and the residual melt crystallization enthalpy, ΔHmc (420° C./10 min) was determined by conversion of the area of the peak.

Described specifically, about 10 mg of each PTK (powder) was weighed. After holding the PTK at 50° C. for 5 minutes in an inert gas atmosphere, it was heated at a rate of 75° C./min up to 420° C. and held at that temperature for 10 minutes. While cooling the PTK at a rate of 10° C./min, its Tmc (420° C./10 min) and ΔHmc (420° C./10 min) were measured.

Results are collectively shown in Table 1. Measurement of melt viscosity increment in terms of times:

In order to investigate the melt viscosity increment (in terms of times) of each of the PTKs obtained respectively in the Synthesis Experiments, a powder sample of the PTK was loaded on Capillograph (manufactured by Toyo Seiki Seisakusho Co., Ltd.) equipped with a nozzle having an internal diameter of 1 mm and an length-to-diameter ratio of 10/1 (L/D =10/1). The polymer sample was held at 385° C. for 5 minutes and then 385° C. for 30 minutes. Subsequent to the holding of the product for each of the time periods, the melt viscosity $\eta^*$ of the product was measured at 385° C. and a shear rate of 1,200/sec. The increment (in terms of times) of the viscosity $\eta^*$ (385° C./30 min) to the viscosity $\eta^*$ (385° C./5 min) was then determined.

Further, each of the PTK powders obtained respectively in the Synthesis Examples was impregnated with an aqueous solution of calcium hydroxide, whereby 0.3 part by weight of calcium hydroxide was added per 100 parts by weight of each PTK. The resultant product was similarly loaded on the Capillograph equipped with the nozzle having the internal diameter of 1 mm and the length-to-diameter ratio of 10/1 (L/D =10/1). The product was held at 380° C. for 5 minutes and then 380° C. for 30 minutes. Subsequent to the holding of the product for each of the time periods, the melt viscosity $\eta^*$ of the product was measured at 380° C. and a shear rate of 1,200/sec. The increment (in terms of times) of the viscosity $\eta^*$ (380° C./30 min) to the viscosity $\eta^*$ (380° C./5 min) was then determined.

Results are collectively shown in Table 1.

Measurements of density and solution viscosity:

With respect to the individual PTKs obtained in the Synthesis Experiments, their densities were measured as indices of their crystallinity.

Namely, each PTK (powder) was first of all placed between two sheets of polyimide film ("Kapton", trade mark; product of E.I. du Pont de Nemours & Co., Inc.). It was preheated at 385° C. for 2 minutes and then press-formed at 385° C. for 0.5 minute by a hot press. It was then quenched to obtain an amorphous sheet whose thickness was about 0.15 mm. A part of the amorphous sheet was used directly as a sample, while the remaining part was annealed at 280° C. for 30 minutes to use it as an annealed sample with an increased degree of crystalization.

Their densities were measured at 25° C. by means of a density gradient tube of the lithium bromide/water system.

As to the melt-stable PTKs, their solution viscosities (reduced viscosities, $\eta_{red}$) were measured respectively as indices of their molecular weights.

Namely, each PTK sample was dissolved in 98 wt.% sulfuric acid to give a polymer concentration of 0.5 g/dl. The viscosity of the resultant solution was then measured at 25° C. by means of a Ubbellohde viscometer.

Results of these measurements are also given collectively in Table 1.

TABLE 1

| Polymer code | P1 | P2 | R1 | R2 | R2C |
|---|---|---|---|---|---|
| Heat resistance | | | | | |
| Tm (°C.) | 362 | 363 | 365 | 335 | 331 |
| Melt stability | | | | | |
| ΔHmc (420° C./10 min) (J/g) | 58 | 52 | 0 | 0 | 0 |
| Tmc (420° C./10 min) (°C.) | 300 | 298 | ND[2] | ND[2] | ND[2] |
| $\eta^*$(385° C./30 min)/$\eta^*$(385° C./5 min) | 2 | 2 | >>10[3] | >>10[3] | >>10[3] |
| $\eta^*$(380° C./30 min)/$\eta^*$(380° C./5 min)[1] | <1.5 | <1.5 | >>10[3] | >>10[3] | >>10[3] |
| Solution viscosity | | | | | |
| $\eta_{red}$ (dl/g) | 0.78 | 0.58 | — | — | — |
| Density (25° C.) | | | | | |
| Amorphous sheet (g/cm³) | 1.30 | 1.30 | 1.28–1.30[4] | 1.28–1.30[4] | 1.27–1.28[4] |
| Annealed sheet (g/cm³) | 1.35 | 1.35 | 1.30–1.31[4] | 1.30–1.31[4] | 1.28–1.30[4] |
| Remarks | Used in Ex. | Used in Ex. | Conventional PTK. Used in | Conventional PTK. Used in | Conventional cured PTK. Used in |

TABLE 1-continued

| Polymer code | P$_1$ | P$_2$ | R$_1$ | R$_2$ | R$_{2C}$ |
|---|---|---|---|---|---|
| | | | Comp.Ex. | Comp.Ex. | Comp.Ex. |

[1] Melt viscosity increment, in terms of times, of a product obtained by adding 0.3 part by weight of calcium hydroxide to 100 parts by weight of the PTK.
[2] ND: Not detected.
[3] Flowability was substantially lost when held for 30 minutes.
[4] A decomposition or crosslinking reaction accompanied by localized foaming was observed upon melt formation of the sample sheet, and the density varied locally.

It was found from Table 1 that Polymer P$_1$ and Polymer P$_2$, both melt-stable PTKs, were great in Tmc and ΔHmc, were stable and retained sufficient crystallinity even when held at 420° C. for 10 minutes while Polymers R$_1$, R$_2$ and R$_{2C}$, all conventional PTKs, were reduced in both Tmc and ΔHmc, were substantially crosslinked and almost lost crystallinity.

It was also found that Polymer P$_1$ and Polymer P$_2$ remained stable and showed only a small increase in melt viscosity even when held at 385° C. for 30 minutes while Polymers R$_1$, R$_2$ and R$_{2C}$ according the conventional processes underwent a crosslinking reaction, was increased in viscosity and substantially lost flowability.

Further, it was also found that the products obtained by adding calcium hydroxide to Polymer P$_1$ and Polymer P$_2$ respectively remained stable and showed only a small increase in melt viscosity even when held at 380° C. for 30 minutes while those obtained respectively by adding calcium hydroxide to Polymers R$_1$, R$_2$ and R$_{2C}$ according the conventional processes underwent a cross-linking reaction, showed an abrupt increase in viscosity and substantially lost flowability.

It has also been found from Table 1 that Polymer P$_1$ and Polymer P$_2$, melt-stable PTKs, had high density and crystallinity and their annealed products had a density as high as 1.34 g/cm$^3$ or even higher while Polymers R$_1$, R$_2$ and R$_{2C}$, PTKs according to the conventional processes, underwent a crosslinking reaction accompanied by localized foaming upon melt formation of sample sheets and hence provided low-density and low-crystallinity sheets only. In particular, the density of the sheet from the cured polymer, Polymer R$_{2C}$, was low and its crystallinity was also low.

EXAMPLE 1:

Polymers P$_1$, P$_2$, R$_1$, R$_2$ and R$_{2C}$, the PTKs prepared in the above Synthesis Experiments respectively, were separately ground in a jet mill as needed, whereby fine powders having an average particle size of about 10–20 μm were obtained respectively. Per 100 parts by weight of each fine PTK powder thus obtained, were added 30 parts by weight of titanium oxide ("Ti-Pure#900", trade name; product of E.I. du Pont de Nemours & Co., Inc.), 5 parts by weight of sodium laurylsulfonate, 3 parts by weight of polyvinyl alcohol ("GOSE-NOL#KH-20", trade name; product of The Nippon Synthetic Chemical Industry Co., Ltd.) and 200 parts by weight of water. They were then mixed in a porcelain ball mill. Aqueous slurries S$_1$, S$_2$, Q$_1$, Q$_2$ and Q$_{2C}$ were prepared respectively.

Employed as metal bases were aluminum plates (10 cm×10 cm×0.3 cm) which had been cleaned by sand blasting, trichloroethylene washing and subsequent infrared ray drying. The aluminum plates were coated with the aqueous slurries S$_1$, S$_2$, Q$_1$, Q$_2$ and Q$_{2C}$ respectively. The thus-applied slurries were dried under infrared rays and then heated at 400° C. for 40 minutes, thereby forming coating layers of about 40 μm thick respectively. With respect to each of the PTK-resin coated aluminum plates thus obtained, external appearance (surface smoothness) inspection, peeling test (adhesion test) and pinhole test were conducted.

Results are shown collectively in Table 2. As will be understood from Table 2, Polymers P$_1$ and Polymer P$_2$, melt-stable PTKs, were found to form PTK resin coating layers having a smooth surface and excellent adhesion properties and containing no pinholes.

TABLE 2

| Polymer code | P$_1$ | P$_2$ | R$_1$ | R$_2$ | R$_{2C}$ |
|---|---|---|---|---|---|
| External appearance[1] | Smooth | Smooth | Rough | Rough | Rough |
| Peeling tendency[2] | None | None | Peeled | Peeled | Peeled |
| Pinholes[3] | None | None | Formed | Formed | Formed |
| Remarks | Used in Ex. | Used in Ex. | Conventional PTK. Used in Comp. Ex. | Conventional PTK. Used in Comp. Ex. | Conventional cured PTK. Used in Comp. Ex. |

[1] Inspected by visual observation of the external appearance.
[2] A grid pattern of 2 mm squares were cut into the coating layer. An adhesive tape was applied on the cross-hatched area and was then pulled off. The coating layer was observed if any of the squares in the grid were pulled off.
[3] Pinhole test was conducted using a Tesler coil.

EXAMPLE 2:

Using a blender, 100 parts by weight of a fine powder of Polymer P$_1$ obtained in Example 1 and 40 parts by weight of titanium oxide having average particle size of about 2 μm were mixed to prepare a mixed powder M$_1$. The mixed powder M$_1$ was fluidized by a nitrogen stream, whereby a fluidized bed was formed.

An aluminum plate which had been cleaned in the same manner as in Example 1 and had been preheated to about 400° C. was immersed in the fluidized bed, so that the mixed powder was melt-coated on its surface. The thus-coated aluminum plate was thereafter heated at 400° C. for 40 minutes to obtain a PTK-resin coated aluminum plate whose coating layer was about 400 μm thick.

Its external appearance was smooth, and its peeling strength as measured by forming a cut in the coating layer, peeling the coating layer at the thus-cut end and then conducting a pulling test at 5 cm/min on an Instron was 1.4 kg/cm$^2$. No pinhole was contained.

Example 3:

Instead of the aluminum plate, titanium plate, SUS 304 plate and iron plate were used as metal bases. They were separately sand-blasted, washed in trichloroethylene and dried under infrared rays, so that they were cleaned. They were then subjected to a flame treatment for about 2 minutes by a gas burner. Using the mixed powder $M_1$ in the same manner as in Example 2, a PTK resin coating layer of about 400 μm thick was formed on each of the plates. The thus-obtained coated metal plates all had smooth external appearance. The peeling strength was at least 1 kg/cm$^2$, and no pinholes were contained.

EXAMPLE 4:

A portion of the mixed powder $M_1$ obtained in Example 2 was applied with negative electrostatic charges. As a metal base, an aluminum plate cleaning in the same manner as in Example 1 was used. The aluminum plate was preheated to about 400° C. and was applied with an opposite potential. Using a Coulomb force, the surfaces of the aluminum plate were coated with the mixed powder $M_1$. The mixed powder $M_1$ was molten. The aluminum plate was then heated at 400° C. for 40 minutes, whereby a PTK-resin coated aluminum plate was obtained. The resultant coating layer had a thickness of about 400 μm. The coated aluminum plate had smooth external appearance. Its peeling strength was 1.6 kg/cm$^2$, and no pinholes were contained.

Example 5:

In a blender, 100 parts by weight of a fine powder of Polymer $P_1$ obtained in Example 1 and 40 parts by weight of mica powder having an average particle size of about 50 μm were mixed to prepare a mixed powder $M_2$.

An aluminum plate which had been cleaned in a similar manner as in Example 1 and has been preheated to about 400° C. was used as a metal base. The mixed powder $M_2$ was sprayed against the aluminum plate. The mixed powder $M_2$ was hence molten to coat the aluminum plate therewith. The thus-coated aluminum plate was heated at 400° C. for 40 minutes, so that the mixed powder was molten to form a coating layer of about 200 μm thick as an undercoat. The undercoated aluminum plate was similarly coated with the mixed powder $M_1$ obtained in Example 2, thereby obtaining a coated aluminum plate with the coating layers which were about 400 μm thick in total.

A steam resistance test was conducted on aluminum plates having both the undercoat and PTK-resin coating layer as well as on aluminum plates coated only with the mixed powder $M_1$ to a thickness of about 400 μm in the same manner. Namely, an upright glass pipe equipped with a condenser and an internal heater was used. The coated aluminum plate samples were press-fitted and secured to both upper and lower end flanges thereof respectively. The pipe was filled with water to about 80% of its internal capacity. Heating the pipe by a heater, the water was boiled for 30 hours. The state of occurrence of blisters in the coated aluminum plates on the upper and lower ends by steam was observed in vapor phase and liquid phase respectively. As a result, occurrence of blisters was not observed in the coated aluminum plates provided with the mica-containing undercoat. On the other hand, the coated aluminum plates which were not provided with any undercoat showed occurrence of blisters at both the upper and lower ends.

EXAMPLE 6:

Charged in a porcelain ball mill were 100 parts by weight of a fine powder of Polymer $P_1$ prepared in Example 1, 400 parts by weight of NMP, 20 parts by weight of polytetrafluoroethylene ("Fluon#171", trade name; product of Imperial Chemical Industry Co., Ltd.), and 70 parts by weight of a 40 mole %/60 mole % copolymer of tetrafluoroethylene and hexafluoropropylene. The ball mill was rotated to grind and mix the contents, whereby Slurry $S_3$ was prepared.

An aluminum plate which had been cleaned in the same manner as in Example 1 was coated with Slurry $S_3$. The thus-applied slurry was dried under infrared rays and then heated at 400° C. for 30 minutes, thereby forming an undercoat of about 10 μm thick.

Using a porcelain ball mill, 100 parts by weight of NMP, 20 parts by weight of polytetrafluoroethylene and 10 parts by weight of a tetrafluoroethylene/hexafluoropropylene copolymer were ground and mixed to prepare Slurry F.

The aluminum plate coated with the undercoat of the fluropolymer was coated with Slurry F. After drying under infrared rays, the aluminum plate was heated at 400° C. for 20 minutes. This operation was repeated 5 times, so that a coated aluminum plate having a fluoropolymer topcoat was obtained. Eggs were fried on the coated aluminum plate. Sticking was not observed at all.

We claim:

1. A coated metal body comprising a metal base or a metal base having an undercoat of an inorganic and/or organic material and at least one coating layer formed on the metal base or the undercoat to a thickness of 5–1,000 μm with a poly(arylene thioether-ketone) resin coating material, said resin coating material comprising:

(A) 100 parts by weight of a poly(arylene thioether-ketone) having predominant recurring units of the formula

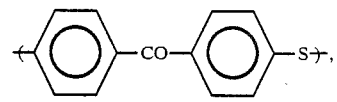

wherein the —CO— and —S— are in the para position to each other, and having the following physical properties (a)–(c):

(a) melting point, Tm being 310–380° C.;

(b) melt crystallization temperature, Tmc (420° C./10 min) being at least 210° C. and residual melt crystallization enthalpy, ΔHmc (420° C./10 min) being at least 10 J/g, wherein Tmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.; and (c) reduced viscosity being 0.2–2 dl/g as determined by viscosity measurement at 25° C. and a polymer concentration of 0.5 g/dl in 98 percent by weight sulfuric acid;

(B) 0–400 parts by weight of a thermoplastic resin and/or a thermosetting resin compatible with the poly(arylene thioether-ketone); and (C) 0–150 parts by weight, per 100 parts by weight of the sum of the poly(arylene thioether-ketone) and the thermoplastic resin and/or thermosetting resin, of at least one filler selected from fibrous fillers, inorganic fillers and metallic fillers.

2. The coated metal body as claimed in claim 1, wherein the poly(arylene thioether-ketone) has a density of at least 1.34 g/cm$^3$ at 25° C. when annealed at 280° C. for 30 minutes.

3. The coated metal body as claimed in claim 1, wherein the poly(arylene thioether-ketone) has a melt viscosity increment in terms of times, $\eta^*(385° C./30 min)/\eta^*(385° C./5 min)$ of 10 or smaller, said $\eta^*(385° C./30 min)$ and $\eta^*(385° C./5 min)$ representing the melt viscosities of the poly(arylene thioether-ketone) when measured at 385° C. and a shear rate of 1200 sec$^{-1}$ after preheating the poly(arylene thioether-ketone) at 385° C. for 30 minutes and 5 minutes respectively.

4. The coated metal body as claimed in claim 1, wherein when 0.3 part by weight of calcium hydroxide is added to 100 parts by weight of the poly(arylene thioether-ketone), the resultant product has a melt viscosity increment in terms of times, $\eta^*(380° C./30 min)/\eta^*(380° C./5 min)$ of 5 or smaller, said $0^*(380° C./30 min)$ and $\eta^*(380° C./5 min)$ representing the melt viscosities of the product when measured at 380° C. and a shear rate of 1200 sec$^{-1}$ after preheating the product at 380° C. for 30 minutes and 5 minutes respectively.

5. The coated metal body as claimed in claims 1, wherein the poly(arylene thioetherketone) resin coating material is in the form of a powder having an average particle size of 0.1–200 μm, and the coating layer is formed by applying the powder as a slurry dispersed in a dispersing medium composed of water and/or an organic solvent on the metal base or the undercoat and then heating the thus-applied slurry at 310–500° C. for 1 minute to 20 hours into a coating layer of 5–300 μm thick.

6. The coated metal body as claimed in claim 5, wherein the thus-applied slurry is dried before its heating.

7. The coated metal body as claimed in claims 1, wherein the poly(arylene thioetherketone) resin coating material is in the form of a powder having an average particle size of 1–500 μm, and the coating layer is formed by spraying the powder against the metal base or undercoat heated at 310–500° C. to have the powder melt-coated on the metal base or undercoat and then heating the melt-coated powder at 310–500° C. for 1 minute to 20 hours into a coating layer of 5–1,000 μm thick.

8. The coated metal body as claimed in claim 1, wherein the poly(arylene thioetherketone) resin coating material is in the form of a powder having an average particle size of 1–500 μm, and the coating layer is formed by immersing the metal base or the metal base having the undercoat, which has been heated to 310–500° C., in a fluidized bed of the powder to have the powder melt-coated on the metal base or undercoat and then heating the melt-coated powder at 310–500° C. for 1 minute to 20 hours into a coating layer of 5–1,000 μm thick.

9. The coated metal body as claimed in claim 1, wherein the poly(arylene thioetherketone) resin coating material is in the form of a powder having an average particle size of 1–500 μm, and the coating layer is formed by charging the powder with electrostatic charges, coating the metal base or undercoat, which has been applied with a potential opposite to the electrostatic charges, with the powder by virtue of a Coulomb force and then heating the thus-coated powder at 310–500° C. for 1 minute to 20 hours into a coating layer of 5–1,000 μm thick.

10. The coated metal body as claimed in claim 1, wherein the metal base is selected from aluminum, iron, titanium, chromium, nickel, and alloys containing at least one of these metals.

11. The coated metal body as claimed in claim 1, wherein the undercoat has a thickness of 5–300 μm and is formed by coating the metal base with a composition formed of 100 parts by weight of the poly(arylene thioether-ketone) and 10–300 parts by weight of mica powder.

* * * * *